United States Patent
Ranier et al.

(10) Patent No.: US 8,400,111 B2
(45) Date of Patent: Mar. 19, 2013

(54) METHOD FOR DRIVING MICRO-HYBRID SYSTEM FOR VEHICLE AND ENERGY STORAGE UNIT, AND HYBRID SYSTEM FOR IMPLEMENTING THE SAME

(75) Inventors: Marc Ranier, Villeneuve le Roi (FR); Jean-Claude Matt Matt, Dijon (FR); Pierre Sardat, Le Raincy (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 473 days.

(21) Appl. No.: 12/663,469

(22) PCT Filed: Jun. 3, 2008

(86) PCT No.: PCT/FR2008/050972
§ 371 (c)(1),
(2), (4) Date: Jun. 18, 2010

(87) PCT Pub. No.: WO2009/001001
PCT Pub. Date: Dec. 31, 2008

(65) Prior Publication Data
US 2010/0258369 A1    Oct. 14, 2010

(30) Foreign Application Priority Data

Jun. 28, 2007 (FR) .................................. 07 56124

(51) Int. Cl.
*H01M 10/44* (2006.01)
*H01M 10/46* (2006.01)

(52) U.S. Cl. ................................................ 320/132
(58) Field of Classification Search .............. 320/107, 320/116, 132, 149, 150; 324/426, 427, 430, 324/433; 702/63, 64; 903/903, 907
See application file for complete search history.

(56) References Cited

U.S. PATENT DOCUMENTS

| | | | |
|---|---|---|---|
| 5,281,919 A | 1/1994 | Palanisamy | |
| 5,625,272 A | 4/1997 | Takahashi | |
| 6,232,744 B1 | 5/2001 | Kawai et al. | |
| 2002/0140405 A1 | 10/2002 | Malik | |
| 2005/0248315 A1* | 11/2005 | Hartley et al. | 320/132 |
| 2009/0167254 A1* | 7/2009 | Eberhard et al. | 320/152 |
| 2010/0019718 A1* | 1/2010 | Salasoo et al. | 320/103 |
| 2010/0121511 A1* | 5/2010 | Onnerud et al. | 320/119 |

FOREIGN PATENT DOCUMENTS

| | | |
|---|---|---|
| EP | 1 096 636 A | 5/2001 |
| EP | 1 744 433 A | 1/2007 |

* cited by examiner

*Primary Examiner* — Edward Tso
(74) *Attorney, Agent, or Firm* — Berenato & White, LLC

(57) ABSTRACT

A micro-hybrid system (1) including an electric energy storage unit (12) and an electronic control unit (14). The storage unit includes a plurality of elementary cells mounted in series. A method includes the steps of: reading the elementary electric voltages of the elementary cells; deriving information on the state of the storage unit from the read voltages; and taking into account in the control unit the state information for defining an optimal driving of the micro-hybrid system. An electric energy storage unit and a micro-hybrid system with braking recovery is also disclosed.

16 Claims, 2 Drawing Sheets

METHOD FOR DRIVING MICRO-HYBRID SYSTEM FOR VEHICLE AND ENERGY STORAGE UNIT, AND HYBRID SYSTEM FOR IMPLEMENTING THE SAME

FIELD OF THE INVENTION

The present invention is generally applicable in the automotive industry.

More particularly, the invention relates to a method for driving a micro-hybrid system with braking recovery for a vehicle, the system including an electric energy storage unit and an electronic control unit, the electric energy storage unit including a plurality of elementary cells mounted in series.

The invention also relates to a micro-hybrid system with braking recovery and an electric energy storage unit conceived for implementing the method.

TECHNOLOGICAL BACKGROUND OF THE INVENTION

In order to reduce the fuel consumption of vehicles and consequently the pollution which they generate, it is known to equip a vehicle with a micro-hybrid system, for example an alternator-starter, enabling a braking recovery mode.

Equally, a micro-hybrid system of the above type comprising a reversible electrical rotating machine, a reversible AC-DC voltage converter, an electric energy storage unit and a reversible DC-DC converter are known to the entity according to the invention.

The electric energy storage unit is formed from a plurality of very large capacitance condensers known as "super condensers", "ultra-capacitors" or "UCAPs" by the person skilled in the art.

The electric energy recuperated by the electrical rotating machine is stored in the super condensers and is then returned for various uses, particularly to feed consumers with a floating DC voltage greater than the battery voltage.

Taking into account the nominal voltage levels actually available for the super condensers, it is known to mount the latter in series so as to form a pack of super condensers capable of supporting the voltage levels usually present in a micro-hybrid system with braking recovery as indicated above.

In this system, the disparities existing between the nominal voltage levels and capacitance values of the super condensers led the inventors to provide electronic balance circuits.

These electronic balance circuits have a primary function of protecting the super condensers against too high charge voltages able to cause voltage surges or premature ageing of the capacitor assembly, as well as against possible voltage inversions at the terminals of the super condensers which can have destructive consequences including on the electronic circuits connected to the terminals of the super condensers.

A certain homogeneity between the charge voltages of the various super condensers, facilitating the operation of the capacitor assembly, is achieved thanks to these balance circuits.

Thus, for example, if the vehicle is not used over long periods of time, the balance circuits continue to ensure symmetrical discharge from the pack of super condensers, ideally down to 0 V. Indeed, it is desirable that the pack of super condensers always remains balanced (especially with very low voltage) because, when the vehicle is restarted, the need to recharge the pack of super condensers as quickly as possible can have destructive consequences, on account of serious imbalances, if the discharge was not correctly followed through down to very low levels (2 V for example).

The introduction of balance circuits has therefore allowed technical progress in terms of reliability and life of the packs of super condensers.

Today, however, it is desirable to propose new solutions, on the one hand enabling the life of the capacitor assembly in the micro-hybrid system with braking recovery to be additionally increased and, on the other hand the possibilities of the capacitor assembly as a major component of the micro-hybrid system with braking recovery to be better utilized.

GENERAL DESCRIPTION OF THE INVENTION

According to a first aspect, the object of the present invention is to provide a method for driving a new type of micro-hybrid system with braking recovery, which enables the system to be better optimized by offering the possibility of driving, wherein the effective state of the electric energy storage unit is taken into account.

The method for driving a micro-hybrid system with braking recovery according to the invention is implemented in a micro-hybrid system including an electric energy storage unit and an electronic control unit, the electric energy storage unit including a plurality of elementary cells mounted in series, the method comprising the steps of reading the elementary electric voltages of the elementary cells and deriving information on the state of the electric energy storage unit from the read elementary voltages.

In accordance with the invention, the state information includes data on the state of health comprising the difference in voltage between the elementary cell which is the most charged and the elementary cell which is the least charged of the electric energy storage unit, the data on the state of health being representative of the capacity of the electric energy storage unit to fulfil its function in the micro-hybrid system, and the method comprises a step of taking into account, in the electronic control unit, the state information including the data on the state of health for defining an optimal driving of the micro-hybrid system.

The method according to the invention, as briefly described above, is preferably applied in a micro-hybrid system with braking recovery, wherein the electric energy storage unit is a pack of super condensers. The method according to the invention, however, can be used in systems where the electric energy storage unit consists of battery cells.

According to particular embodiments, the method according to the invention can also comprise one or more of the following features:

- the state information includes the maximum elementary voltage stemming from the elementary cell which is the most charged;
- the state information includes the minimum elementary voltage stemming from the elementary cell which is the least charged;
- the state information includes a measurement of temperature in the electric energy storage unit;
- the state information includes differential capacitance data representative of the maximum change in electrical capacitance between the elementary cells;
- the method also includes the steps of: measuring over a predetermined length of time, in the electric energy storage unit, a predetermined current crossing the elementary cells and deriving, at the end of the predetermined length of time, the differential capacitance data based on the difference in maximum voltage detected between the read elementary voltages and based on the measurement of current over the predetermined length of time;

the state information includes differential parasitic resistance data representative of the maximum change in parasitic resistance between the elementary cells;

the method also includes the steps of: deriving a first difference in maximum voltage between the elementary cells based on the read elementary voltages when no significant current circulates in the electric energy storage unit, injecting into the electric energy storage unit a predetermined current over a predetermined short length of time, deriving a second difference in maximum voltage between the elementary cells based on the read elementary voltages during the injection of current and deriving the differential parasitic resistance data based on the difference between the first and second variations in voltage and based on the intensity level of the current of short duration.

According to a second aspect, the invention relates to an electric energy storage unit capable of implementing the method according to the invention briefly described above.

According to a preferred embodiment, the electric energy storage unit includes a plurality of super condenser elements, forming elementary cells mounted in series, and electronic means.

Notably, the electric energy storage unit according to the invention also comprises additional means rendering it capable of implementing the method according to the invention briefly described above.

According to an extra feature, these additional means comprise electronic circuits capable of generating at least one signal conveying at least one of said items of state information, this signal being intended to be transmitted to the electronic control unit.

According to a third aspect, the invention also relates to a transmission signal generated by electronic circuits contained in the electric energy storage unit briefly described above.

According to a first particular embodiment, the signal according to the invention comprises a component of useful information conveying at least one state information item and a component of phase difference capable of enabling an electric continuity fault in a signal transmission carrier to be detected and/or the effects of contact corrosion in at least one connector of the system to be counteracted.

According to a second particular embodiment, the signal according to the invention is of the pulse width modulated (PWM) type.

According to other aspects, the invention also relates to a micro-hybrid system with braking recovery including means rendering it capable of implementing the method of the invention briefly described above, as well as to a vehicle equipped with such a system.

The electric energy storage unit as briefly described above is advantageously integrated in the micro-hybrid system with braking recovery according to the invention.

In addition, the micro-hybrid system according to the invention can comprise one or more of the following features:

- at least one electronic control unit capable of processing the state information derived by implementing the method briefly described above;
- in addition to the electric energy storage unit and electronic control unit, the system also comprises an electrical rotating machine, an AC-DC voltage converter and a DC-DC voltage converter;
- the electronic control unit is contained at least partially in the AC-DC voltage converter and/or the DC-DC voltage converter.

Other advantages and features of this invention will appear more evident on reading the description below of several particular embodiments with reference to the appended drawings, wherein:

DESCRIPTION OF PARTICULAR EMBODIMENTS OF THE INVENTION

Figure 1:
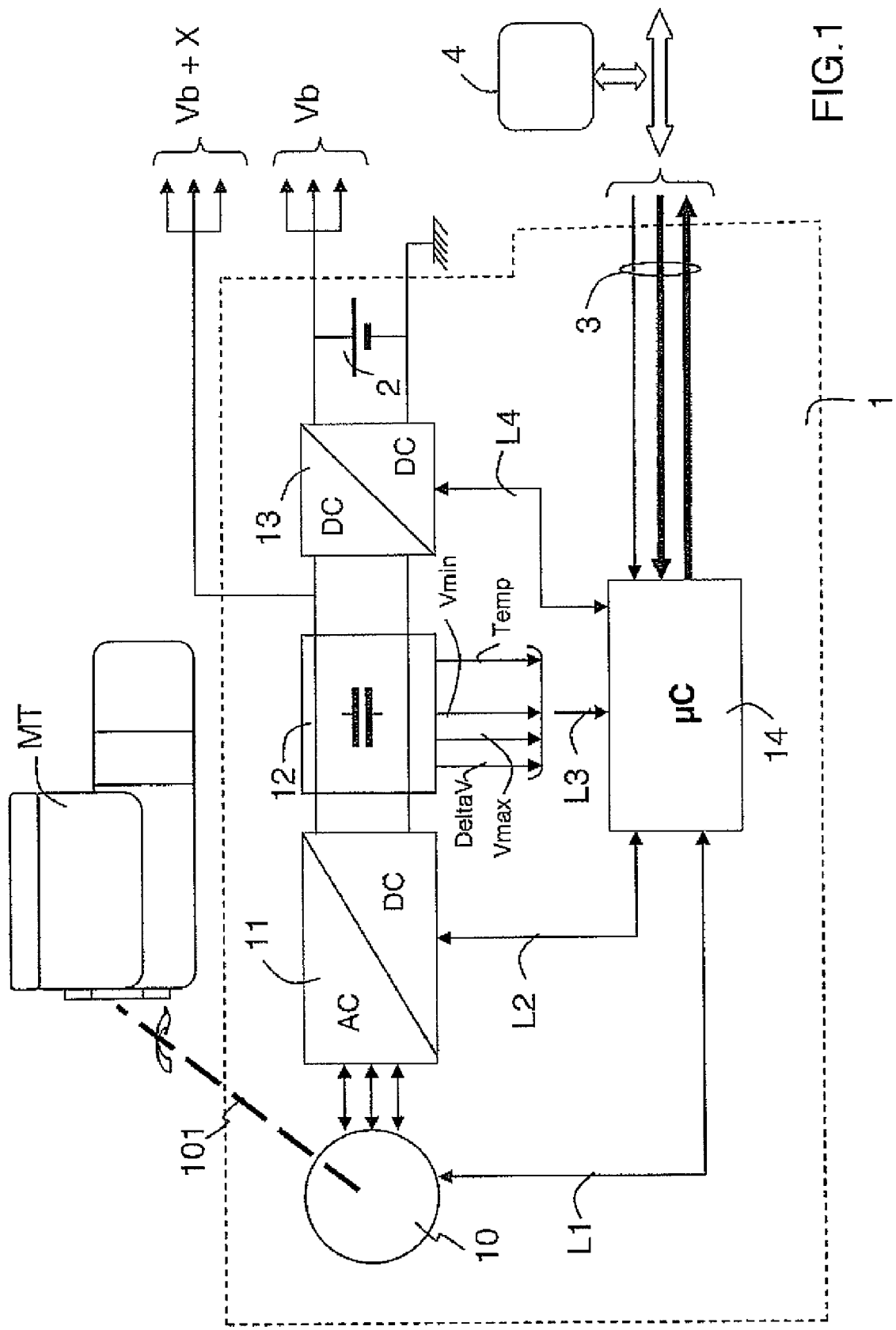
FIG. 1 is a general block diagram of a particular embodiment of a micro-hybrid system with braking recovery according to the invention.

With reference to FIG. 1, a particular embodiment 1 of a micro-hybrid system with braking recovery according to the invention is now described.

As shown in FIG. 1, in this particular embodiment, the micro-hybrid system 1 according to the invention primarily includes an electrical rotating machine 10, a reversible AC-DC voltage converter 11, a capacitive electric energy storage unit 12, a DC-DC voltage converter 13 and a microcontroller 14.

The micro-hybrid system 1 is connected to an on-board dual voltage electrical network of the vehicle able to provide a low DC voltage Vb and a high floating DC voltage Vb+X.

The low DC voltage Vb is generally that of 12 V from a lead-acid battery 2 equipping the vehicle. Preferably, the Vb voltage can be used to feed consumers in the vehicle requiring a relatively stable voltage level, such as lighting and signalling devices.

In this particular embodiment, the DC voltage Vb+X varies for example between 12 and 60 V and is available at the terminals of the capacitive energy storage unit 12 whose voltage charge particularly depends on the braking recovery operation of the electrical rotating machine 10.

The Vb+X voltage can be used preferentially and as a priority to feed consumers accepting a variable voltage such as de-icing equipment for example. In certain applications, however, the Vb+X voltage could also be used, through a dedicated DC-DC voltage converter (not illustrated), to feed a consumer requiring stable DC voltage, for example a car radio operating on 12 V. Moreover, in certain applications, the Vb+X voltage can also be used to supply voltage higher than 12 V to the electrical rotating machine 10 functioning in starter or motor mode.

As illustrated in FIG. 1, the electrical rotating machine 10 is mechanically coupled, connection 101, to a heat engine MT of the vehicle. Here, machine 10 is a three-phase machine of the alternator-starter type which, in addition to the starter and alternator operating modes, is also capable of functioning in the braking recovery mode and in the torque assistance mode. In the torque assistance mode, machine 10 provides additional mechanical torque for traction of the vehicle in addition to that provided by the heat engine MT.

AC/DC converter 11 is a reversible device and whenever the electrical rotating machine 10 has to function in the motor/starter mode, enables machine 10 to be supplied with three-phase AC voltage obtained from DC voltage present at the terminals of the capacitive energy storage unit 12 and, whenever the electrical rotating machine 10 has to function in the alternator mode, enables the three-phase voltage provided by machine 10 to be rectified in the form of rectified DC voltage.

This rectified DC voltage charges the capacitive energy storage unit 12 and, through the DC-DC voltage converter 13, battery 2.

The capacitive energy storage unit 12 here is primarily made up of a pack of super condensers equipped with appropriate electronic circuits. For reasons of convenience, the capacitive energy storage unit 12 is designated as a "pack of super condensers" in the rest of the description.

The pack of super condensers 12 is described in detail below with reference to FIG. 2 and, in this embodiment, comprises ten super condenser elements C1 to C10 mounted in series.

The pack of super condensers 12, while being charged with DC voltage supplied by the AC-DC voltage converter 11, enables electric energy to be stored whenever the electrical rotating machine 10 is functioning in the braking recovery mode or in the alternator mode. The energy stored in the pack of super condensers 12 can be returned to the Vb+X voltage network to feed various consumers and, in certain cases, to the Vb voltage network, through the DC-DC voltage converter 13, for example whenever machine 10 is not supplying power and battery 2 is unable to respond to peak current demand on the Vb voltage network. Moreover, the energy stored in the pack of super condensers 12, as already indicated above, can be used for starting the heat engine or assisting the torque of the latter with Vb+X voltage which can be very substantially higher than conventional 12 V, thus enabling the rotating machine 10 to supply the high mechanical torques required in the case of large heat engines.

The DC-DC voltage converter 13 is a reversible device and, on the one hand, allows transfer of energy to the Vb voltage network to feed the consumers and to charge the battery 2 and, on the other hand, transfer of energy in the opposite direction on the basis of 12 V voltage from the battery 2 in order if necessary to charge the pack of super condensers 12 and to supply the AC-DC voltage converter 11 whenever the rotating machine 10 is functioning as a motor/starter.

The microcontroller 14 manages the operation of the micro-hybrid system 1 on the basis of information representative of the internal state of the micro-hybrid system 1 and the state of the vehicle. A model of driving strategies is implemented in the microcontroller 14 so as to direct the micro-hybrid system 1. State information and commands can be exchanged between the microcontroller 14 and various functional elements of the micro-hybrid system 1 through signal exchange links. Signal exchange links L1, L2, L3 and L4 between the microcontroller 14 and the elements 10, 11, 12 and 13 are illustrated in FIG. 1.

As is also shown in FIG. 1, a data communication bus 3, of the CAN type for example, is also provided for data exchange between the micro-hybrid system 1 and one or more electronic control units (ECU) 4 of the vehicle. Information such as pressure on the brake pedal or the accelerator pedal can thus be transmitted to the micro-hybrid system 1 by an ECU unit 4 through the data communication bus 3.

Figure 2:
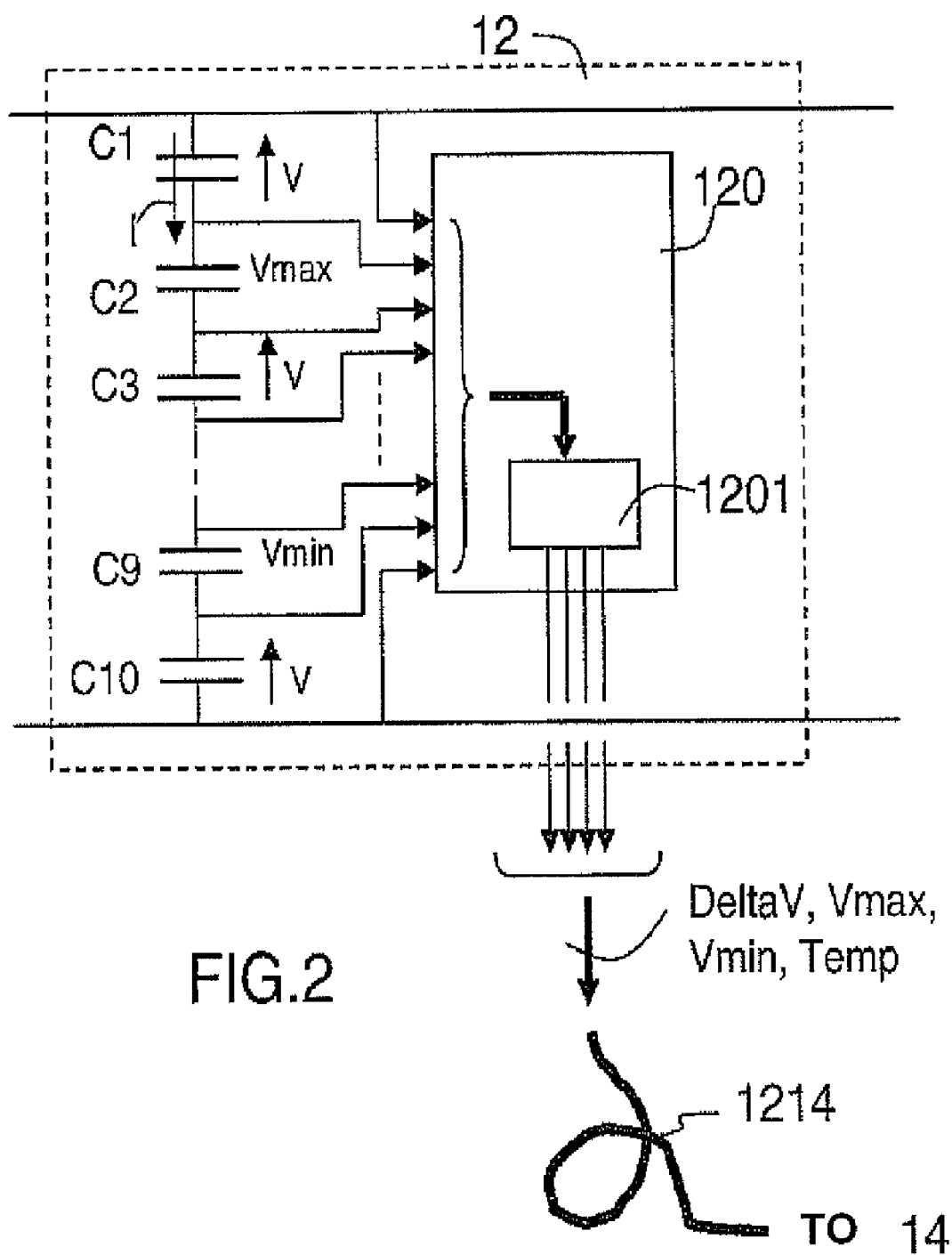
FIG. 2 is a simplified diagram of a capacitive electric energy storage unit contained in the system of FIG. 1.

With reference more particularly to FIG. 2, the pack of super condensers 12 as an electric energy storage unit and its signal exchange link L3 with the microcontroller 14 is now described in detail.

As is shown in FIG. 2, the pack of super condensers 12 in this embodiment primarily comprises ten super condenser elements C1 to C10 mounted in series as well as electronic circuits 120. These super condenser elements C1 to C10 form as many elementary cells mounted in series and contained in the pack 12.

Balance circuits, integrated in the circuits 120, are thus provided so as to balance the terminal voltages of the super condenser elements and thus to prevent voltages capable of causing breakdowns or premature ageing of these elements from being exceeded. Balance circuits for super condenser element units are known by the person skilled in the art and will not be described in the present application.

In accordance with the present invention, with this embodiment, circuits 120 also comprise interface and measuring circuits 1201 capable of generating signals of health and those for driving the pack 12, namely DeltaV, Vmax, Vmin and Temp signals which will be described in detail in the following paragraphs.

DeltaV, Vmax, Vmin and Temp signals are transmitted to the microcontroller 14 through the L3 link established through a signal transmission carrier 1214. DeltaV, Vmax, Vmin and Temp signals enable the microcontroller 14 to manage the pack of super condensers 12 in an optimum way.

As will become clearer below, the DeltaV signal carries information relating to the state of health of the pack of super condensers 12. Vmax, Vmin and Temp signals in turn carry data relating to the electrical state of the pack of super condensers 12 and facilitate the driving of the latter.

In accordance with the invention, the elementary voltages present at the terminals of each super condenser element C1-C10 are read and information is derived about the state of health, that is to say, data representative of the capacity of the pack of super condensers to fulfil its function in the micro-hybrid system, on the basis of the phase differences in voltage present between the super condenser elements. This information about the state of health of the pack 12 is carried by the DeltaV signal which indicates the difference in voltage between the super condenser element which is charged the most and that which is charged the least. By way of example, in FIG. 2, the C2 element, at the terminals of which Vmax voltage is present, is the super condenser element which is the most charged and the C9 element, at the terminals of which Vmin voltage is present, is the super condenser element which is the least charged.

Tests performed by the entity according to the invention show that the older the super condenser elements become, the greater the differences in their electrical properties, particularly the leakage current and capacitance values. At the end of the life of the pack of super condensers, these differences end up rendering the use of the latter difficult, or even impossible.

The DeltaV signal allows the microcontroller 14:
  to measure the variations in capacitance, internal resistance and differences in leakage current between the super condenser elements,
  to be able to inform the vehicle system that the pack of super condensers is about to fail or is in a state of failure, and
  to decide in an optimum way the manner in which the pack of super condensers is used throughout its life, in the knowledge that the degradation in the properties of the pack of super condensers at the end of its life can be slow, while adjusting the driving strategy of the hybrid micro system so as to prolong the life of the pack of super condensers.

The Vmax signal allows the microcontroller 14 to know the voltage level present at the terminals of the most charged (C2 in the example of FIG. 2) of the super condenser elements. Knowing this Vmax value, the microcontroller 14 can influence the maximum level of the charge voltage of the pack of super condensers, so as not to risk causing destructive overload on one of the elements of the pack of super condensers, or causing premature ageing of one or more of them. As long as the pack of super condensers is in "good health", the use of this information is not vital because the DeltaV difference is weak but it gradually becomes so as the pack of super condensers ages.

The Vmax signal also enables the microcontroller 14 to know with precision the voltage level present at the terminals of the least charged of the super condenser elements by determining the difference between the two Vmax and DeltaV signals. This information is useful particularly during phases of heavy discharge. Indeed, during these phases, it is desirable not to cause a negative voltage to appear at the terminals of a super condenser element which was not very highly charged at the beginning, because that could result in premature ageing of the element concerned or deterioration of the measurement electronics.

The Vmin signal enables the microcontroller 14 to know the voltage level present at the terminals of the least charged (C9 in the example of FIG. 2) of the super condenser elements. The information carried by the Vmin signal is duplicated by that which can be obtained by performing the subtraction operation of Vmax−DeltaV. However, the Vmin signal can enable a consistency check to be performed on the validity of the other two DeltaV and Vmax signals and, in the event of failure, one to be compensated by the other.

The Temp signal enables the microcontroller 14 to know the temperature of the pack of super condensers. This enables the microcontroller 14 to adjust in real-time a strategy for managing the voltage so as to preserve in the best possible way the health of the pack of super condensers which, in general, tolerates temperatures that are too high poorly (ageing or destruction). For example, the operating voltage can thus be reduced in the event of high voltage.

In accordance with the invention, the DeltaV, Vmax, Vmin and Temp signals are generated in the pack of super condensers 12 using suitable electronic means. The Vmax and Vmin signals can be obtained for example by a voltage comparison circuit (not illustrated) contained in the circuits 1201. The DeltaV and Temp signals can be obtained for example by a subtraction circuit and a circuit for measuring temperature (not illustrated) also contained in the circuits 1201.

In the particular embodiment described here of a pack comprising several super condensers mounted in series, faulty operation or failure of only one of the super condenser elements cannot inevitably be detected in relation to the complete pack of super condensers because there is a risk that this faulty operation or failure will be masked by the good performance of the other super condenser elements.

In accordance with the invention, in addition to the uses of the DeltaV, Vmax and Vmin signals as described above to convey simple driving and health data, relating to the pack of super condensers 12, it is also possible to employ these signals to measure variations in the capacitance levels between the super condenser elements as well as in the values of series equivalent parasitic resistance. This enables the degradation of the electrochemical properties of only one super condenser element among several to be monitored, which would be impossible through overall measurement.

Measurement of Differential Capacitance between the Super Condenser Elements:

To perform this measurement of differential capacitance, a current I, shown in FIG. 1, circulating in the pack of super condensers 12 is measured. The intensity determined for the current I is about 20 A, for example.

The microcontroller 14 measures the variation in voltage on the DeltaV signal over a length of time T and can thus derive the maximum differences in capacitance value between the super condenser elements, using the equation DeltaC=$[\int_0^T I.dt]$/[Delta V(T)−DeltaV(0)], DeltaC being the differential capacitance measurement.

From the differential capacitance measurements performed, the microcontroller 14 builds up a partial internal electric model of the pack of super condensers 12 and can thus anticipate the performance of the latter in order to optimize its use.

Measurement of Differential Series Parasitic Resistance between the Super Condenser Elements:

To perform this measurement of differential series parasitic resistance, the microcontroller 14 directs two successive measurements of DeltaV.

The first measurement is performed without any significant current circulating in the pack of super condensers 12 and enables a first value for DeltaV$_1$ to be obtained.

A second measurement is performed with a current of strong amplitude I circulating in the pack of super condensers 12 and enables a second DeltaV$_2$ value to be obtained. For example, the intensity determined for current I is about 200 A. Current I is injected into the pack of super condensers 12 over a short duration t at the end of which the DeltaV$_2$ value is measured. A strong value for current I is preferable in order to detect a sufficient increase in voltage to perform measurements on the terminals of the super condenser elements. However, the injected current I must be of short duration so as to minimize the component arising from the charging of the super condenser element in the voltage increase, to the benefit of the component arising from the series resistance of this same element.

The value of differential series parasitic resistance is then computed by the microcontroller 14 by calculating the difference between DeltaV$_1$ and DeltaV$_2$ and by dividing the latter with the value of current I injected into the pack of super condensers 12.

Any abnormal imbalance between the parasitic resistances of the super condenser elements or their electrical power connections inside the pack 12 can thus be detected and a foreseeable threat of failure, or occurrence of failure, on only one or more of the super condenser elements can be derived therefrom.

Three examples of methods compatible with the invention to transmit DeltaV, Vmax, Vmin and Temp data from the pack of super condensers 12 to the microprocessor 14 are now described.

Given the nature of the information to be transmitted and the important capacitance values (typically 2000 Farads for each super condenser element), a bandwidth of about a few hundred Hertz is suitable for the DeltaV, Vmax Vmin and Temp signals. This facilitates the transmission of these signals between the pack of super condensers 12 and the microcontroller 14, as in this waveband signals can be easily rendered mostly resistant to electromagnetic interference (EMI) of the conducted or radiated kind. It is the same for the influence of power type common mode voltages between the pack of super condensers 12 and the microcontroller 14.

Transmission of Voltage Signals:

In this first method of transmission, DeltaV, Vmax, Vmin and Temp data are transmitted in an analogue way by voltage levels, with a component of useful data and a component of phase difference. The component of phase difference corresponds to a voltage phase difference in the signals which enables an electric continuity fault, due to a disconnected cable or a deteriorated signal transmission carrier for example, to be detected. Moreover, the voltage phase difference enables passage of a current of a few milliamps to be forced through the connectors, thus avoiding the effects of contact ("fretting") corrosion.

For example, in a particular embodiment, DeltaV, Vmax, Vmin and Temp data can be transmitted by means of voltage signals V1, V2, V3 and V4 as defined below:

$$V1=5.DeltaV+1\ V,$$

$$V2=Vmax+1\ V,$$

$$V3=Vmin+1\ V,$$

$$V4=Temp+1\ V.$$

A voltage phase difference of +1 V is introduced into all the signals. In the V1 signal, a G=5 gain is applied to DeltaV thus, particularly on the useful signal (DeltaV), minimizing the effect of common mode noises between the pack of super condensers 12 and the microcontroller 14, the value of DeltaV being typically less than 100 mV. No gain is introduced into the signals V2, V3 and V4, taking into account the orders of magnitude of Vmax, Vmin and Temp. Vmax and Vmin typically have orders of magnitude of approximately 2.7 V and approximately 1.4 V respectively, while the scale of the temperature data Temp is that suitable for the temperature measurement electronics (NTC sensor, PTC sensor, platinum probe or other temperature sensors).

Transmission of Current Signals:

In this second method of transmission, DeltaV, Vmax, Vmin and Temp data are transmitted in an analogue way by current levels, with a component of useful data and a component of phase difference. The component of phase difference corresponds to a current phase difference in the signals, which enables an electric continuity fault, due to a disconnected cable or a deteriorated signal transmission carrier for example, to be detected. Moreover, the current phase difference enables passage of a weak current to be forced through the connectors, thus avoiding the effects of contact ("fretting") corrosion.

For example, in one particular embodiment, DeltaV, Vmax, Vmin and Temp data can be transmitted by means of current signals I1, I2, I3 and I4 as defined below:

$$I1=DeltaV/200\Omega+1\ mA,$$

$$I2=Vmax/1\ k\Omega+1\ mA,$$

$$I3=Vmin/1\ k\Omega+1\ mA,$$

$$I4=Temp/1\ k\Omega+1\ mA.$$

The resistance value of 200Ω introduced into I1 gives 5 mA/V of voltage imbalance. The current phase difference of 1 mA is generally sufficient to clean a standard contact.

It will be noted in a general way that a DeltaV imbalance >1 V renders the pack of super condensers practically unusable. It is thus possible to limit the maximum current value I1 to a relatively low level, which enables effective protection of the input-outputs to be guaranteed.

For I2, I3 and I4, taking into account the orders of magnitude for Vmax, Vmin and Temp, the introduction of a resistance value of 1 kΩ has proved to be satisfactory.

Transmission of Pulse Width Modulated (PWM) Signals:

In this third method of transmission, useful DeltaV, Vmax, Vmin and Temp data are conveyed by pulse width modulated carriers. This useful data is thus contained in the duty cycle values of the transmitted signals. It will be noted, however, that generation of a precise and modular duty cycle based on an analogue value generally requires the use of a microcontroller. What this means is that this method, to be implemented, may require the availability of a microcontroller in the electronic circuits 120 of the pack of super condensers 12.

On the other hand, pulse width modulation PWM offers the advantage of excellent resistance to electromagnetic interference.

Of course, this invention is not limited to the particular embodiments which have been described here by way of example. Various alternative embodiments could be realized by the person skilled in the art depending on the applications concerned. Thus, by way of example, in certain alternatives, the DeltaV, Vmax, Vmin and Temp signals could be generated in digital form by the pack 12 for transmission to the microcontroller 14 in time-multiplexed form for example. Time-multiplexing of analogue signals for transmission over the same signal transmission carrier might also be of interest in certain applications.

Moreover, it is clear for the person skilled in the art that the processing functions fulfilled by the microcontroller 14, relating to the implementation of the method according to the invention, can be performed completely or partially in other microcontrollers or microprocessors of the hybrid system such as those which are usually integrated in AC-DC and DC-DC voltage converters 11 and 13 or in microprocessors or microcontrollers of the vehicle. In yet another alternative, the processing functions fulfilled by the microcontroller 14, relating to the implementation of the method according to the invention, can also be performed completely or partially in the electronic circuits 120 of the pack of super condensers.

The invention claimed is:

1. A method for driving a micro-hybrid system with braking recovery for a vehicle, said micro-hybrid system (1) including an electric energy storage unit (12) and an electronic control unit (14), said electric energy storage unit (12) including a plurality of elementary cells (C1 to C10) mounted in series, the method comprising the steps of:
   reading elementary electric voltages (V) of said elementary cells (C1 to C10); and
   deriving a state information on a state of the electric energy storage unit (12) from said read elementary voltages (V);
   said state information including state of health data comprising the difference in voltage DeltaV=Vmax−Vmin between a maximum elementary voltage (Vmax) defined by a voltage of the elementary cell which is the most charged (C2) and a minimum elementary voltage (Vmin) defined by a voltage of the elementary cell which is the least charged (C9) of said electric energy storage unit (12);
   said state of health data (DeltaV) being representative of the capacity of the electric energy storage unit (12) to fulfil its function in said micro-hybrid system (1);
   the method further comprising the step of defining an optimal driving of said micro-hybrid system (1) by taking into account, in said electronic control unit (14), said state information including said state of health data (DeltaV).

2. The method according to claim 1, wherein said state information includes a temperature measurement (Temp) in said electric energy storage unit (12).

3. The method according to claim 1, wherein said state information includes differential capacitance data (DeltaC) representative of the maximum change in electric capacitance between said elementary cells (C1 to C10).

4. The method according to claim 3, further including the steps of:
   measuring, over a predetermined length of time (T) in said electric energy storage unit (12), a predetermined current (I=20 A); and
   deriving, at the end of said predetermined length of time (T), said differential capacitance data (DeltaC) based on the difference in maximum voltage (DeltaV) detected between said read elementary voltages (V) and based on said measurement of said predetermined current over said predetermined length of time (T).

5. The method according to claim 1, wherein said state information includes differential parasitic resistance data (DeltaR) representative of the maximum change in parasitic resistance between said elementary cells (C1 to C10).

6. The method according to claim 5, said method further including the steps of:
   deriving a first difference in maximum voltage (DeltaV$_1$) between said elementary cells (C1 to C10) based on said read elementary voltages (V) when no significant current circulates in said electric energy storage unit (12);
   injecting into said electric energy storage unit (12) a predetermined current (I=200 A) over a predetermined short length of time (t);
   deriving a second difference in maximum voltage (DeltaV$_2$) between said elementary cells (C1 to C10) based on said read elementary voltages (V) during said injection of said predetermined current; and
   deriving said differential parasitic resistance data (DeltaR) based on the difference (DeltaV$_2$–DeltaV$_1$) between said first and second variations in voltage and based on the intensity level (I=200 A) of said predetermined current of short duration.

7. The method according to claim 1, wherein said electric energy storage unit (12) includes a plurality of super condenser elements (C1 to C10) mounted in series as said elementary cells.

8. A vehicle equipped with a micro-hybrid system with braking recovery for a vehicle including means for implementing the method according to claim 1.

9. An electric energy storage unit including a plurality of super condenser elements (C1 to C10) forming elementary cells mounted in series, and electronic means (120) comprising additional means (1201) for implementing a method for driving a micro-hybrid system with braking recovery for a vehicle, said micro-hybrid system including said electric energy storage unit and an electronic control unit, the method comprising the steps of:
   reading elementary electric voltages (V) of said elementary cells (C1 to C10); and
   deriving a state information on a state of the electric energy storage unit from said read elementary voltages (V);
   said state information including state of health data comprising the difference in voltage DeltaV=Vmax−Vmin between a maximum elementary voltage (Vmax) defined by a voltage of the elementary cell which is the most charged and a minimum elementary voltage (Vmin) defined by a voltage of the elementary cell which is the least charged of said electric energy storage unit;
   said state of health data (DeltaV) being representative of the capacity of the electric energy storage unit to fulfil its function in said micro-hybrid system;
   the method further comprising the step of defining an optimal driving of said micro-hybrid system by taking into account, in said electronic control unit, said state information including said state of health data (DeltaV).

10. The electric energy storage unit (12) according to claim 9, wherein said additional means comprise electronic circuits (1201) capable of generating at least one transmission signal conveying at least one of items of said state information, said at least one transmission signal being intended to be transmitted to said electronic control unit (14).

11. A transmission signal generated by electronic circuits (1201) contained in an electric energy storage unit (12) according to claim 10, comprising a component of useful information conveying at least one of said items of said state information and a component of phase difference 1V, 1 mA capable of enabling an electric continuity fault in a signal transmission carrier (1214) to be detected and/or the effects of contact corrosion in at least one connector of the system to be counteracted.

12. A transmission signal generated by electronic circuits (1201) contained in an electric energy storage unit (12) according to claim 10, wherein said transmission signal is of the pulse width modulated (PWM) type.

13. The transmission signal according to claim 11, wherein a bandwidth of said transmission signal is about a few hundred Hertz.

14. A micro-hybrid system with braking recovery for a vehicle, said micro-hybrid system including an electric energy storage unit and an electronic control unit, said electric energy storage unit including a plurality of elementary cells (C1 to C10) mounted in series, said micro-hybrid system further including means for implementing a method for driving said micro-hybrid system comprising the steps of:
   reading elementary electric voltages (V) of said elementary cells (C1 to C10); and
   deriving a state information on a state of the electric energy storage unit from said read elementary voltages (V);
   said state information including state of health data comprising the difference in voltage DeltaV=Vmax−Vmin between a maximum elementary voltage (Vmax) defined by a voltage of the elementary cell which is the most charged and a minimum elementary voltage (Vmin) defined by a voltage of the elementary cell which is the least charged of said electric energy storage unit;
   said state of health data (DeltaV) being representative of the capacity of the electric energy storage unit to fulfil its function in said micro-hybrid system;
   the method further comprising the step of defining an optimal driving of said micro-hybrid system by taking into account, in said electronic control unit, said state information including said state of health data (DeltaV).

15. A micro-hybrid system with braking recovery for a vehicle according to claim 14, comprising an electric energy storage unit (12), an electronic control unit (14), an electrical rotating machine (10), an AC-DC voltage converter (11) and a DC-DC voltage converter (13).

16. The micro-hybrid system according to claim 15, wherein said electronic control unit (14) is contained at least partially in said AC-DC converter (11) and/or said DC-DC voltage converter (13).

* * * * *